United States Patent [19]
Davies

[11] Patent Number: 5,097,933
[45] Date of Patent: Mar. 24, 1992

[54] COUPLING FOR LINEAR DISPLACEMENT TRANSDUCER

[75] Inventor: Stephen H. Davies, Telford, Great Britain

[73] Assignee: Lucas Industries Public Limited Company, West Midlands, England

[21] Appl. No.: 678,193

[22] Filed: Apr. 1, 1991

[30] Foreign Application Priority Data

Apr. 6, 1990 [GB] United Kingdom ............... 9007783

[51] Int. Cl.$^5$ .............................................. F16D 11/04
[52] U.S. Cl. ................................. 192/141; 192/138
[58] Field of Search ..................... 192/138, 141, 143

[56] References Cited

U.S. PATENT DOCUMENTS

| | | | |
|---|---|---|---|
| 826,858 | 7/1906 | Jones | 192/141 |
| 2,029,094 | 1/1936 | De Vlieg et al. | 192/138 X |
| 3,326,054 | 6/1967 | Canick et al. | 192/141 X |
| 3,621,763 | 11/1971 | Geyer | 92/17 |
| 4,114,747 | 9/1978 | Eiler | 192/143 X |
| 4,350,041 | 9/1982 | Loker et al. | 73/432 |
| 4,373,742 | 2/1983 | Svoboda | 192/14 X |
| 4,641,737 | 2/1987 | Gillingham et al. | 192/138 X |
| 4,666,026 | 5/1987 | Poulin | 192/141 |

FOREIGN PATENT DOCUMENTS

| | | | |
|---|---|---|---|
| 0303399 | 2/1988 | European Pat. Off. | |
| 55196 | 4/1967 | Fed. Rep. of Germany | 192/143 |
| 775477 | 10/1980 | U.S.S.R. | 192/138 |

OTHER PUBLICATIONS

Soviet Patent Abstracts, Sectoin S-X Electrical, Week 8910, Apr. 19, 1989, Derwent Publications Ltd., London, SO 2 SU-01 421 982 European Search Report.

Primary Examiner—Leslie A. Braun
Assistant Examiner—Nicholas Whitelaw
Attorney, Agent, or Firm—Nixon & Vanderhye

[57] ABSTRACT

The core of a liner displacement transducer is coupled to a rotatable movable member by a threaded stem which engages the member for rotation therewith and is axially slidable relative thereto. The stem threadedly engages a nut which is axially located on a fixed part of the transducer and is restrained against rotation by a spring loaded detent. Projections on the stem are engageable with respective abutments on the nut at opposite limits of linear travel of the stem, causing the nut to rotate and preventing further change in the position of the core.

7 Claims, 3 Drawing Sheets

COUPLING FOR LINEAR DISPLACEMENT TRANSDUCER

BACKGROUND OF THE INVENTION

1. Field of the Invention

This invention relates to a device for effecting mechanical coupling between a movable part of an apparatus and a linear displacement transducer which is required to signal an operating position of that movable part.

2. Discussion of Prior Art

In particular a device according to the invention is intended to signal the operating position of a linearly movable element in an actuator for deploying and stowing thrust reversers on a gas turbine engine. Such an actuator is shown in U.S. Pat. No. 3,621,763 and includes a rod which is threadedly engaged with an output element of the actuator and which rotates, but does not translate, as the output elements moves linearly. The rod is required to provide an indication of the position of the output element, relative to a fixed part of the actuator. However if a connection between the output element and a part upon which it acts is such as to permit rotation of the output element relative to the aforesaid fixed part, the threaded rod will give a false position indication.

European patent application 0303399 discloses a linear position transducer which is responsive to the rotations of the threaded stem, and hence to the actuator output position, and shows a device by means of which movement of an input element of the transducer is arrested at predetermined limiting positions thereof. Since the limiting positions and the transducer are stationary relative to the fixed part of the actuator, the transducer is effectively reset at each end of actuator travel.

It is a disadvantage of the device shown in EP-A-0303399 that the resetting positions of the transducer are dependent on the initial axial position of the latter relative to said fixed part. The transducer thus requires precise initial positioning which can be achieved only during initial assembly or by means of factory overhaul. The present invention provides a device by means of which replacement of a transducer can be effected without affecting the resetting positions thereof.

SUMMARY OF THE INVENTION

According to the invention there is provided a device for coupling a rotatable member to a linear variable displacement transducer, comprising a nut which is located axially on a stationary part of the transducer and is restrained against rotation relative thereto by a spring-loaded detent on said stationary part, a threaded stem engaging said nut and a linearly movable core of said transducer, said stem having a first projection engageable, at one limiting extent of linear travel of said stem, with a first abutment on said nut to cause the latter to overcome said detent and to rotate with said stem, whereby beyond said one limiting extent of linear travel the posiion of said core remains unaltered.

In a preferred embodiment said stem has a second projection engageable, at an opposite limiting extent of linear travel of said stem, with a second abutment on said nut, to cause the latter to rotate and maintain the position of said core unaltered.

BRIEF DESCRIPTION OF THE DRAWINGS

An embodiment of the invention will now be described by way of example only and with reference to the accompanying drawings in which.

DETAILED DISCUSSION OF PREFERRED EMBODIMENTS

Figure 1:
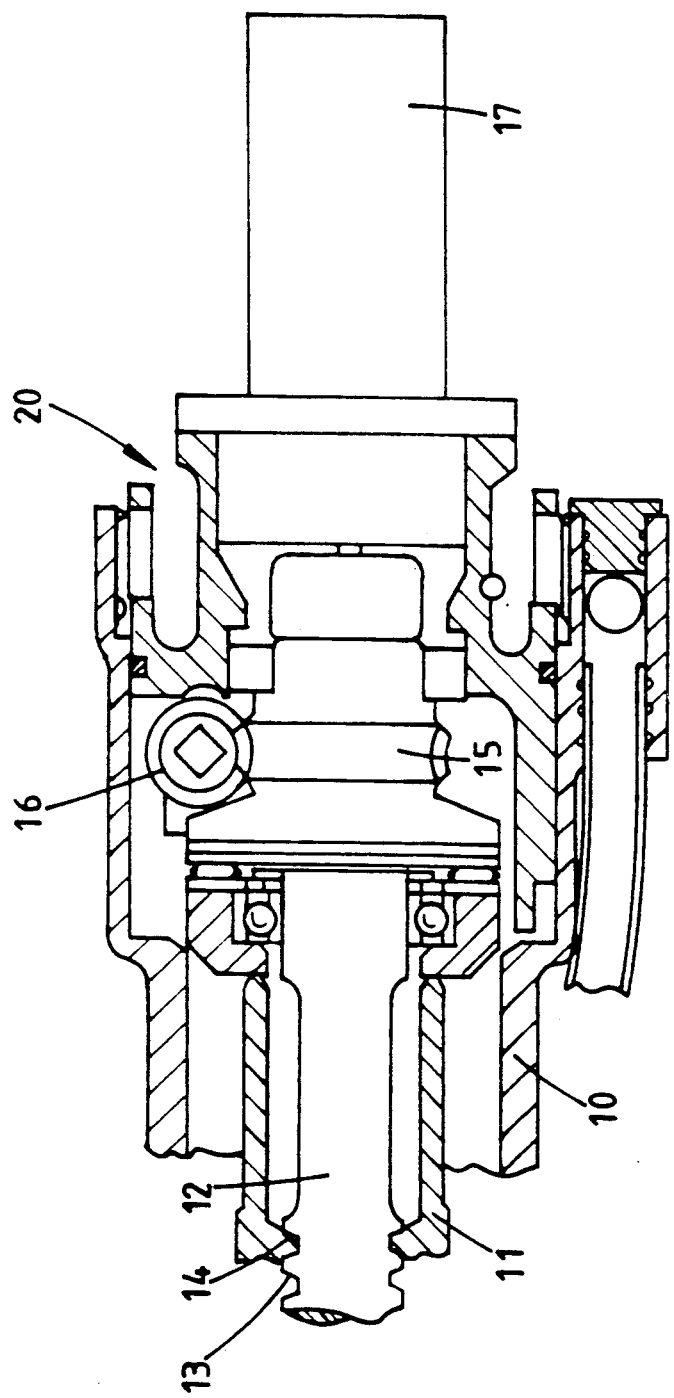
FIG. 1 is a longitudinal section through one end of a linear actuator.

FIG. 1 shows one end of a linear actuator of the type shown and described in U.S. Pat. No. 3,621,763. The actuator has a housing 10 within which an output element 11 is axially movable by fluid pressure. A rod 12 is journalled in the housing 10 and is restrained against axial movement relative to the housing 10. The rod 12 extends within a bore of the output element 11 and has a high-efficiency thread 13 which engages a complementary thread 14 in the element 11. As toothed wheel 15 is secured to the rod 11 for rotation therewith and engages a worm 16 from which a flexible transmission (not shown) extends to a corresponding worm in an identical actuator. The actuators are therefore constrained to operate in unison.

A linear variable displacement transducer 17 is mounted on the housing 10 and has an input stem 24 which is both linearly movable and rotatable, only the linear movement resulting in a change in output of the transducer 17. Coupling between the rod 12 and transducer 17 is by way of a device, indicated at 19 and shown in detail in FIGS. 2 and 3.

Figure 2:
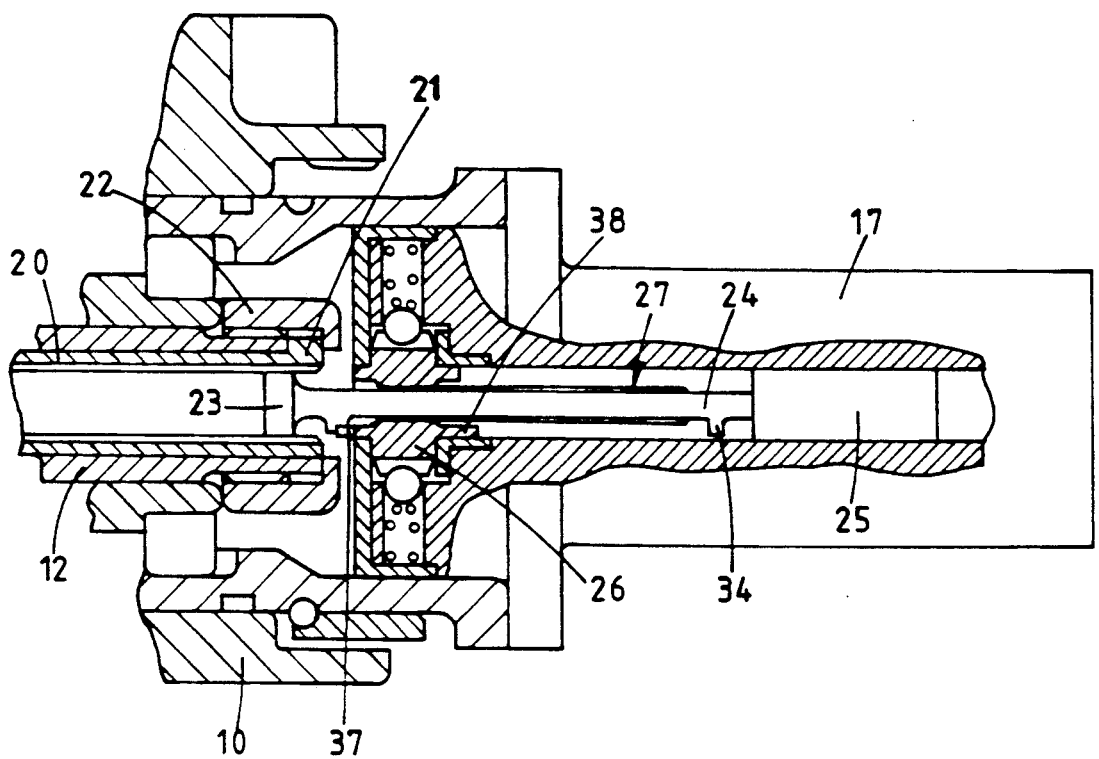
FIG. 2 is a section to an enlarged scale of part of FIG. 1.
Figure 3:
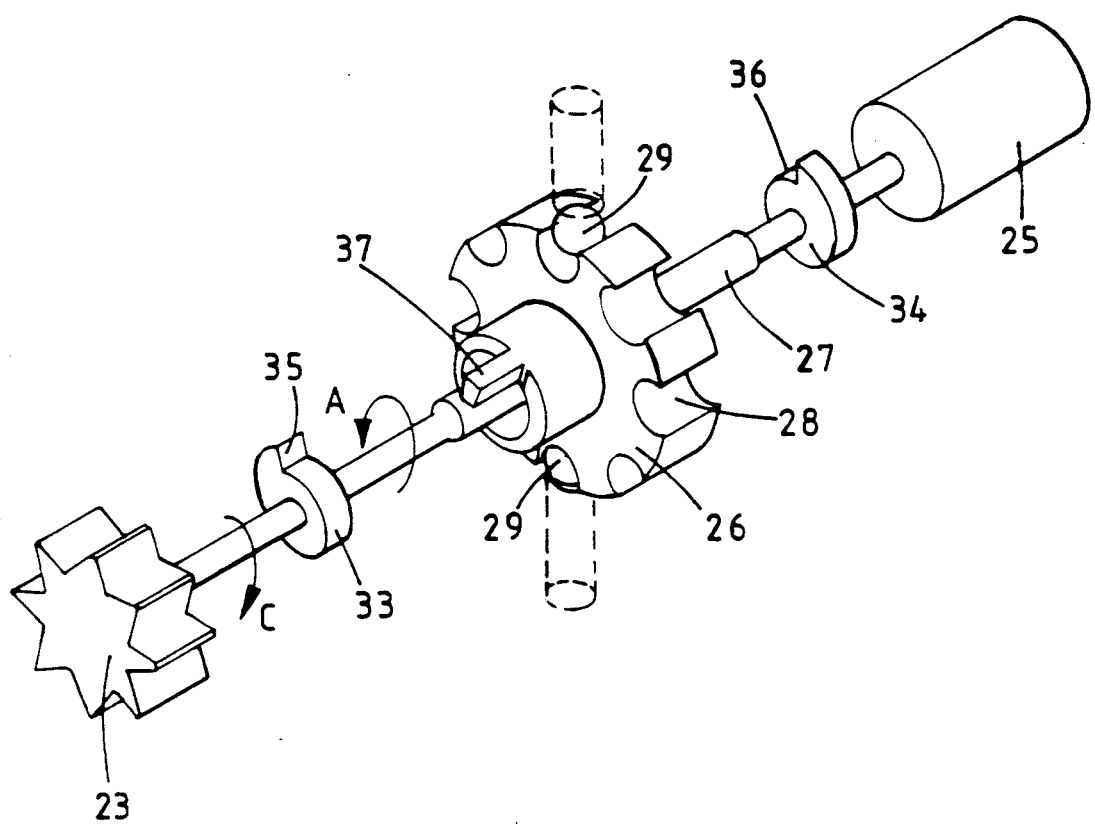
FIG. 3 is a pictorial view of a coupling forming part of FIG. 2.

As shown in FIG. 2 an internally splined bush 20 is located within a bore in the rod 12 by means of a radial dog 21 and is maintained in position by a nut 22. The splined bush 20 engages complementary splines at one end 23 of a stem 24, so that the later rotates with the rod 12 and is freely slidable therein. Secured to the other end of the stem 24 is the movable core 25 of the transducer 17. The core 25 cooperates with relatively stationary coils located within the transducer housing. Secured to, or within, an end of the housing of the transducer 17 is a threaded bush 26 which engages a threaded portion 27 of the stem 24. As shown in FIG. 3 the periphery of the bush 26 has a plurality of equiangularly spaced indentations 28 which can engage balls 29 which are axially slidable in diametrally-opposed radial channels 30 on, or within, the end of the transducer 17. The balls 29 are biased into engagement with the bush 26 by respective springs 31, and thereby provide a spring-loaded detent for the bush 26.

As shown more clearly in FIG. 3 the stem 24 carries parts 33,34 having respective faces 35,36 which are directed in opposite directions of rotation of the stem 24. Clockwise rotation C of the stem 24 is accompanied by its rightward movement, as viewed in the drawing, until the face 35 engages an abutment 37 on the bush 26, whereupon the bush 26 overcomes its detent and rotates with the stem 24. Axial movement of the stem 24 is thereby arrested and the output signal from the transducer remains constant during further clockwise rotation of the stem 24. Anticlockwise rotation A of the stem 24 results in its corresponding leftward movement until the face 36 engages an abutment 38 (FIG. 2) corresponding to the abutment 37 and on the opposite side of the bush therefrom. whereupon axial movement of the stem 24 is arrested. The lead of the thread on the portion 27 is selected having regard to the lead of the thread 13 (FIG. 1), the travel of the actuator and the distance between the parts 33,34. The last of these dimensions is determined by the permissible travel of the transducer core 25 and is slightly greater than the movement of the stem 24 in response to travel of the actuator output element 11 between its limiting positions.

For assembly, either initially or during replacement, the stem 24 may readily be screwed through the bush 26 until the appropriate one of the faces 35,36 engages is corresponding abutment 37 or 38. In this condition the transducer output is set to a zero or datum state by, for example, adjusting the axial position of the transducer coils relative to the housing by means of shims. For assembly on to the actuator the transducer 17 is assembled on to the housing 10 of the actuator so that the end 23 of the stem 24 engages the splines in the bush 20. The actuator output element 11 is then driven to one of its limiting positions, as a result of which either the originally abutted one of the faces 35,36 remains engaged with its abutment, or the stem 24 travels to its other limiting axial position, depending on the direction of movement of the actuator. In either case the stem is in a limiting position which corresponds to the appropriate actuator limiting position. The actuator is then moved to its other limit of travel, whereby the stem 24 moves close to, but does not quite reach its other limiting axial position, by virtue of its slightly greater permissible travel, as described in the preceding paragraph. Since the bush 26 is carried by the transducer, the abutments 37,38 will have fixed positions relative both to the housing 10 and the transducer 17, the axial position of the latter relative to the rod 12 is immaterial.

I claim:

1. A device for coupling a rotatable member to a linear variable displacement transducer, comprising a nut which is located axially on a stationary part of the transducer and which is restrained against rotation relative thereto by a spring-loaded detent on said stationary part, a stem threadedly engaging both said nut and a linearly movable core of said transducer, said stem being adapted for driving rotation by said member and being axially slidable relative thereto, said stem having a first projection engageable, at one limiting extent of linear travel of said stem, with a first abutment on said nut to cause said nut to overcome said detent and to rotate with said stem, whereby beyond said one limiting position of linear travel the position of said core is unaltered.

2. A device as claimed in claim 1 in which said stem has a second projection engageable, at an opposite limiting extent of linear travel of said stem, with a second abutment on said nut, to cause said nut to rotate and allow the position of said core to remain unaltered.

3. A device as claimed in claim 2 in which a distance between said first and second abutments is greater than a permissible travel of the core of the transducer.

4. A device as claimed in claim 1 in which said detent comprises a plurality of peripheral recesses in said nut and at least one spring loaded ball carried by said stationary part of the transducer and engageable in said recesses.

5. A device as claimed in claim 1 in which said rotatable member threadedly engages an axially movable actuator output element for rotation thereby, whereby an input to said transducer remains unaltered in response to movement of said output element beyond a limiting position.

6. An actuator arrangement comprising:
first and second actuators, each of said first and second actuators including:
an axially movable actuator element; and
a rotatable member threadedly engaging said element for rotation thereby;
a linear variable displacement transducer;
means for coupling said transducer to said first actuator rotatable member; and
linking means for linking said rotatable members of said first and second actuators for rotation in unison, said means for coupling comprising:
a nut located axially on a stationary part of said transducer and restrained against rotation relative to said transducer by means of a spring loaded detent on said stationary part;
a stem, threadedly engaging said nut and linearly movable core of said transducer, said stem rotatingly driven by said rotatable member associated with said stem and axially slidable relative to said associated rotational member, said stem having a first projection engageable at one limiting extend to linear travel of said stem, with a first abutment on said nut, said first projection and said nut comprising a means for causing said nut to overcome said detent and rotate with said stem such that, beyond said one limiting extent of linear travel, position of said transducer core is unaltered.

7. A device for coupling a rotatable member to a linear variable displacement transducer, said transducer including a movable core, said device comprising:
a nut having a first abutment, said nut located axially on a stationary part of said transducer and restrained against rotation relative thereto by a spring-loaded detent on said stationary part;
a stem threadedly engaging both said nut and a linearly movable core of said transducer, said rotatable member including a means for drivingly rotating said stem, said stem axially slidable relative to said member, said stem having a first projection engageable, at one limiting extent of linear travel of said stem, with said first abutment on said nut, said abutment and said projection comprising a means for causing said nut to overcome said detent and to rotate with said stem, whereby beyond said one limiting position of linear travel the position of said core is unaltered.

* * * * *